United States Patent
Sakaki et al.

(10) Patent No.: US 10,131,763 B2
(45) Date of Patent: *Nov. 20, 2018

(54) MODIFIED NATURAL RUBBER, PROCESS FOR PRODUCING SAME, RUBBER COMPOSITION FOR TIRE, AND PNEUMATIC TIRE

(71) Applicant: SUMITOMO RUBBER INDUSTRIES LTD., Kobe-shi, Hyogo (JP)

(72) Inventors: Toshiaki Sakaki, Kobe (JP); Hirotoshi Otsuki, Kobe (JP); Yuka Yokoyama, Kobe (JP); Tatsuya Miyazaki, Kobe (JP); Ryo Mashita, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/437,758

(22) PCT Filed: Dec. 2, 2013

(86) PCT No.: PCT/JP2013/082325
§ 371 (c)(1),
(2) Date: Apr. 22, 2015

(87) PCT Pub. No.: WO2014/125700
PCT Pub. Date: Aug. 21, 2014

(65) Prior Publication Data
US 2015/0291765 A1    Oct. 15, 2015

(30) Foreign Application Priority Data

Feb. 15, 2013  (JP) ................................. 2013-028202
Feb. 15, 2013  (JP) ................................. 2013-028203

(51) Int. Cl.
| | |
|---|---|
| *C08C 1/04* | (2006.01) |
| *C08K 3/36* | (2006.01) |
| *C08L 7/00* | (2006.01) |
| *C08L 7/02* | (2006.01) |
| *B60C 1/00* | (2006.01) |
| *C08C 4/00* | (2006.01) |
| *C08L 15/00* | (2006.01) |
| *C08K 3/04* | (2006.01) |
| *C08F 136/08* | (2006.01) |

(52) U.S. Cl.
CPC ................ *C08K 3/36* (2013.01); *B60C 1/00* (2013.01); *C08C 1/04* (2013.01); *C08C 4/00* (2013.01); *C08F 136/08* (2013.01); *C08K 3/04* (2013.01); *C08L 7/00* (2013.01); *C08L 7/02* (2013.01); *C08L 15/00* (2013.01); *C08K 3/045* (2017.05)

(58) Field of Classification Search
CPC ................ C08L 7/00; C08L 7/02; C08C 1/04
See application file for complete search history.

(56) References Cited

U.S. PATENT DOCUMENTS

| | | | | |
|---|---|---|---|---|
| 8,809,450 | B2* | 8/2014 | Sakaki | B60C 1/00 524/572 |
| 9,732,165 | B2* | 8/2017 | Sakaki | B60C 1/0016 |
| 9,856,362 | B2* | 1/2018 | Sakaki | C08K 3/36 |
| 9,862,814 | B2* | 1/2018 | Sakaki | C08L 7/00 |
| 2011/0166254 | A1* | 7/2011 | Nishimura | B60C 1/0016 523/155 |
| 2011/0253285 | A1* | 10/2011 | Ichikawa | B60C 1/0016 152/564 |
| 2012/0184671 | A1* | 7/2012 | Sakaki | B60C 1/00 524/572 |
| 2013/0030083 | A1 | 1/2013 | Taguchi et al. | |

FOREIGN PATENT DOCUMENTS

| | | | |
|---|---|---|---|
| CN | 102115554 A | 7/2011 | |
| CN | 102260381 A | 11/2011 | |
| CN | 102268106 A | 12/2011 | |
| CN | 102585041 A | 7/2012 | |
| CN | 102898700 A | 1/2013 | |
| EP | 1 568 713 A1 | 8/2005 | |
| EP | 2377892 A1 | 10/2011 | |
| EP | 2390088 A2 | 11/2011 | |
| EP | 2476708 A1 * | 7/2012 | .............. B60C 1/00 |
| JP | 3294901 B2 | 6/2002 | |
| JP | 2006-213752 A | 8/2006 | |
| JP | 2006-213753 A | 8/2006 | |
| JP | 2010-138360 A | 6/2010 | |

(Continued)

OTHER PUBLICATIONS

Chaikumpollert et al., "Preparation and characterization of protein-free natural rubber", Polym. Adv. Technol., vol. 23, pp. 825-828, 2012.
Chaikumpollert et al., "Protein-free natural rubber", Colloid Polym Sci, vol. 290, pp. 331-338, 2012.
International Search Report issued in PCT/JP2013/082325 dated Jan. 28, 2014.
Kawahara et al., "Removal of proteins from natural rubber with urea", Polym. Adv. Technol., vol. 15, pp. 181-184, 2004.

*Primary Examiner* — Peter D. Mulcahy
(74) *Attorney, Agent, or Firm* — Birch, Stewart, Kolasch & Birch, LLP

(57) ABSTRACT

The present invention provides a modified natural rubber having a good balance of improved fuel economy, heat-aging resistance, processability, and breaking resistance, and a method for producing such a rubber. The present invention also provides a tire rubber composition and a pneumatic tire which are prepared using the modified natural rubber. The present invention relates to a highly purified, modified natural rubber whose pH is adjusted to 2 to 7.

22 Claims, 2 Drawing Sheets

(56) References Cited

FOREIGN PATENT DOCUMENTS

| | | | |
|---|---|---|---|
| JP | 2012-116970 | A | 6/2012 |
| JP | 2012-149134 | A | 8/2012 |
| JP | 2012-241066 | A | 12/2012 |

\* cited by examiner

MODIFIED NATURAL RUBBER, PROCESS FOR PRODUCING SAME, RUBBER COMPOSITION FOR TIRE, AND PNEUMATIC TIRE

TECHNICAL FIELD

The present invention relates to a modified natural rubber, a method for producing the modified natural rubber, a tire rubber composition containing the modified natural rubber, and a pneumatic tire formed using the rubber composition.

BACKGROUND ART

Fuel economy of vehicles has been improved by lowering the rolling resistance of tires to suppress heat build-up. In recent years there has been a growing demand for vehicles with higher fuel economy, and thus further studies are essential to enhance fuel economy. Natural rubber, which is commonly used mainly in inner components of tires, has been considered to have higher fuel economy than styrene-butadiene rubber which is often used in treads and the like. Since the fuel economy of styrene-butadiene rubber has already been greatly improved, further reduction in fuel consumption is increasingly difficult. To achieve even higher fuel economy as the whole tire, the fuel economy of natural rubber also needs to be improved.

An example of a method for improving fuel economy by modifying natural rubber includes washing a mixture of natural rubber latex and a surfactant, as disclosed in Patent Literature 1. In this method, however, proteins and gel fraction are removed to a certain extent but to insufficient levels, and thus further reduction in tan 5 is desired. Moreover, rubber for tires is required to have such properties as heat-aging resistance. The method of Patent Literature 1 unfortunately provides insufficient heat resistance and thus needs improvement to simultaneously provide fuel economy and heat-aging resistance.

Meanwhile, natural rubber has a higher Mooney viscosity and thus lower processability than synthetic rubbers. Usually, natural rubber is mixed with a peptizing agent and then masticated to reduce the Mooney viscosity before use, which lowers productivity. Further, since the mastication breaks the molecular chains of natural rubber, the resultant natural rubber unfortunately loses high molecular weight polymer characteristics that natural rubber originally has, such as good abrasion resistance, fuel economy, rubber strength, and heat-aging resistance.

CITATION LIST

Patent Literature

Patent Literature 1: JP 3294901 B

SUMMARY OF INVENTION

Technical Problem

The present invention aims to solve the above problems and provide a modified natural rubber having a good balance of improved fuel economy, heat-aging resistance, processability, and breaking resistance, and a method for producing such a rubber. The present invention also aims to provide a tire rubber composition and a pneumatic tire which are prepared using the modified natural rubber.

Solution to Problem

The present inventors made earnest studies and found that a modified natural rubber which is highly purified by removing non-rubber components and the like from rubber and whose pH is adjusted to 2 to 7 can be used to remarkably improve the balance of the properties including fuel economy, heat-aging resistance, processability, and breaking resistance, as compared to conventional natural rubber. Accordingly, they completed the present invention.

The present invention relates to a highly purified, modified natural rubber whose pH is adjusted to 2 to 7. Preferably, the modified natural rubber has a Mooney viscosity ML (1+4) at 130° C. of 75 or less as measured in conformity with JIS K 6300:2001-1, and has a heat-aging resistance index defined by the following formula of 75 to 120%, $$\text{Heat-aging resistance index } (\%) = \frac{\text{Mooney viscosity of the modified natural rubber determined after 18-hour heat treatment at 80° C.}}{\text{Mooney viscosity of the modified natural rubber before the treatment}} \times 100.$$

The present invention relates to a modified natural rubber whose pH is 2 to 7, the modified natural rubber being obtained by removing non-rubber components from natural rubber, and treating the resultant rubber with an acidic compound. The modified natural rubber preferably has a heat-aging resistance index defined above of 75 to 120%.

The modified natural rubber preferably has a phosphorus content of 200 ppm or less.

The modified natural rubber preferably has a nitrogen content of 0.15% by mass or less.

The modified natural rubber preferably has a gel content measured as toluene-insolubles of 20% by mass or less.

The present invention relates to a modified natural rubber whose pH is 2 to 7, the modified natural rubber being obtained by washing a saponified natural rubber latex, and treating the washed latex with an acidic compound.

The modified natural rubber preferably has a heat-aging resistance index defined above of 75 to 120%.

The washing is preferably performed until the rubber has a phosphorus content of 200 ppm or less.

The present invention relates to a modified natural rubber whose pH is 2 to 7, the modified natural rubber being obtained by washing a deproteinized natural rubber latex, and treating the washed latex with an acidic compound.

The modified natural rubber preferably has a heat-aging resistance index defined above of 75 to 120%.

The washing is preferably performed until the rubber has a nitrogen content of 0.15% by mass or less.

The pH is preferably determined by cutting the modified natural rubber into cubes at most 2 mm on each side, immersing the cubes in distilled water and extracting them at 90° C. for 30 minutes under microwave irradiation, and then measuring the immersion water with a pH meter.

The present invention relates to a method for producing the above-mentioned modified natural rubber, the method including: Step 1-1 of saponifying natural rubber latex; Step 1-2 of washing the saponified natural rubber latex; and Step 1-3 of treating the washed latex with an acidic compound.

The present invention relates to a method for producing the above-mentioned modified natural rubber, the method including: Step 2-1 of deproteinizing natural rubber latex;

Step 2-2 of washing the deproteinized natural rubber latex; and Step 2-3 of treating the washed latex with an acidic compound.

The present invention relates to a tire rubber composition, including: a rubber component; and at least one of carbon black and a white filler, the rubber component including the above-mentioned modified natural rubber in an amount of 5% by mass or more based on 100% by mass of the rubber component.

A radius of gyration of a cluster of the carbon black is preferably 300 nm or less.

Preferably, the white filler is silica, and a radius of gyration of a cluster of the silica is 600 nm or less.

The radius of gyration is preferably determined by x-ray scattering analysis or neutron scattering analysis.

The analysis is preferably carried out under conditions where q defined by the following Formula 1 is in a range of 10 nm$^{-1}$ or less, $$q = \frac{4\pi \sin(\theta/2)}{\lambda} \quad \text{(Formula 1)}$$

wherein $\theta$ is scattering angle; and $\lambda$ is wavelength of X-rays or neutrons.

The radius of gyration is preferably a maximum radius of gyration $R_g$ among radii of gyration $R_g$ determined by curve fitting a scattering intensity curve $I(q)$ obtained by the analysis to the following Formula 2 and Formula 3:

$$I_{(q)} = \sum_{i=1}^{n} \left( P_i \left[ \left\{ \mathrm{erf}\left(\frac{qR_{gi}}{\sqrt{6}}\right)^3 / q \right\} \right]^{D_{fi}} \exp\left(\frac{-q^2 R_{g(i+1)}^2}{3}\right) + \right.$$

$$G_i \exp\left(\frac{-q^2 R_{g(i+1)}^2}{3}\right) \right) +$$

$$P_{n+1} \left[ \left\{ \mathrm{erf}\left(\frac{qR_{g(n+1)}}{\sqrt{6}}\right)^3 / q \right\} \right]^{D_{f(n+1)}}$$

$$\mathrm{erf}(z) = \frac{2}{\sqrt{\pi}} \int_0^z e^{-t^2} dt \quad \text{(Formula 3)}$$

wherein $P_i$, $G_i$, $R_{gi}$, and $D_{fi}$ are fitting parameters; n is an integer; q is as defined above; and z and t are any positive numbers.

The present invention also relates to a pneumatic tire, formed from the above-mentioned rubber composition.

Advantageous Effects of Invention

The highly purified, modified natural rubber whose pH is adjusted to 2 to 7 according to the present invention markedly improves the balance of the properties including fuel economy, heat-aging resistance, processability, and breaking resistance.

DESCRIPTION OF EMBODIMENTS

[Modified Natural Rubber]

Figure 1:
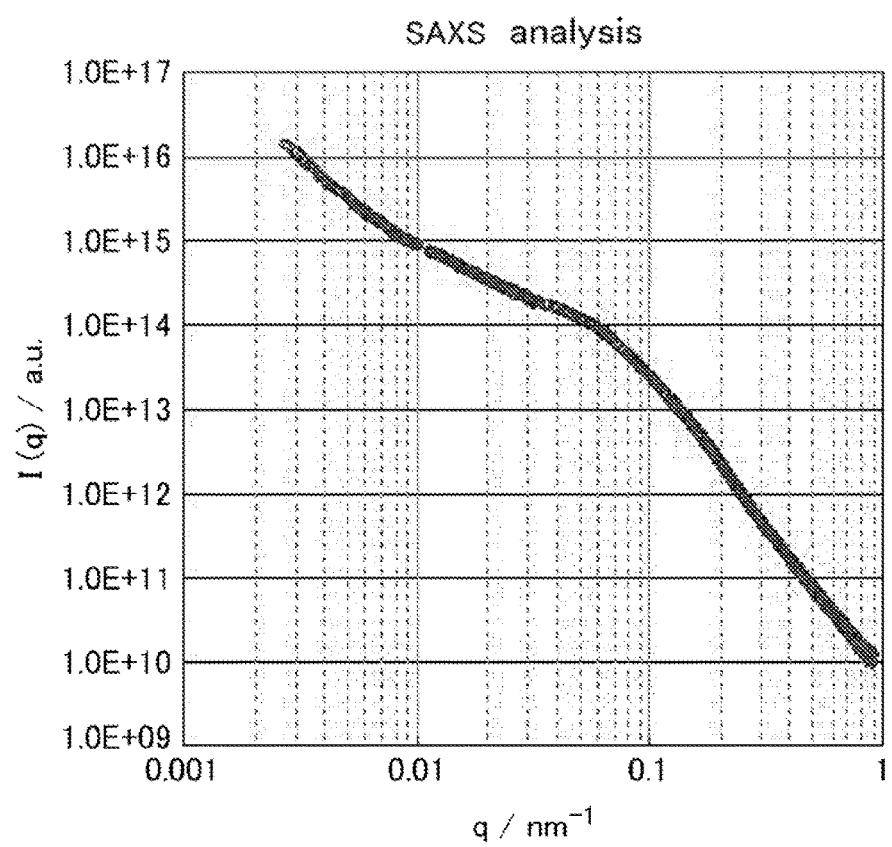
FIG. 1 shows an example of a scattering intensity curve of a sample of an example as determined by SAXS analysis.

The modified natural rubber of the present invention is a highly purified, modified natural rubber whose pH is adjusted to 2 to 7.

The modified natural rubber is highly purified by removing non-rubber components such as proteins and phospholipids, and the pH of the rubber is controlled to an appropriate value. Such a modified natural rubber has improved fuel economy and improved processability. Although the removal of non-rubber components and the basicity or strong acidity of the rubber accelerate deterioration of the rubber, the adjustment of the pH of the rubber prevents reduction in the molecular weight during storage, thereby resulting in good heat-aging resistance. Thus, the balance of the properties including fuel economy, heat-aging resistance, processability, and breaking resistance can be markedly improved.

The term "highly purified" herein means removing impurities such as phospholipids and proteins, other than natural polyisoprenoid components. In natural rubber, the isoprenoid component is covered with such impurity components. If the impurity components are removed, then the structure of the isoprenoid component is altered so that the interaction with compounding agents is changed to reduce energy loss or enhance durability. Thus, a better modified natural rubber is expected to be obtained.

The highly purified, modified natural rubber whose pH is adjusted to 2 to 7 according to the present invention may be any modified natural rubber which is highly purified by reducing the amounts of non-rubber components, and whose pH is 2 to 7. Specific examples include: (1) a modified natural rubber whose pH is 2 to 7, the modified natural rubber being obtained by removing non-rubber components from natural rubber, and treating the resultant rubber with an acidic compound; (2) a modified natural rubber whose pH is 2 to 7, the modified natural rubber being obtained by washing a saponified natural rubber latex, and treating the washed latex with an acidic compound; and (3) a modified natural rubber whose pH is 2 to 7, the modified natural rubber being obtained by washing a deproteinized natural rubber latex, and treating the washed latex with an acidic compound.

The modified natural rubber can be prepared by, for example, methods of washing a saponified natural rubber latex or a deproteinized natural rubber latex with distilled water or the like and then treating the washed latex with an acidic compound as described above. It is essential to lower the pH relative to the pH of distilled water used in the water washing, by shifting the pH to the acidic side by the treatment with an acidic compound. Distilled water usually does not have a pH of 7.00 but has a pH of approximately 5-6. If distilled water with such a pH value is used, it is then essential to reduce the pH to a more acidic range than pH 5-6 by the treatment with an acidic compound. Specifically, it is preferred to reduce the pH by the treatment with an acidic compound to a pH lower by 0.2 to 2 than the pH of water used in the water washing.

The modified natural rubber of the present invention has a pH of 2 to 7, preferably a pH of 3 to 6, more preferably a pH of 4 to 6. Adjusting the pH within the range mentioned above can prevent reduction in heat-aging resistance, thereby resulting in a marked improvement in the balance of the properties including fuel economy, heat-aging resistance, and processability. The pH of the modified natural rubber is determined by cutting the modified natural rubber into cubes at most 2 mm on each side, immersing the cubes in distilled water and extracting them at 90° C. for 30 minutes under microwave irradiation, and then measuring the immersion water with a pH meter. Specifically the pH is determined by a method described in the examples below. Regarding the extraction, one-hour extraction using an ultrasonic washing device or the like cannot completely extract water-soluble components from the inside of the rubber, and thus the pH of the inside cannot be accurately determined; in contrast, the present inventors have found that extraction by the above-mentioned technique can show the reality of the rubber.

The modified natural rubber of the present invention includes those which are highly purified by various methods, such as the above-mentioned rubbers (1) to (3). For example, the modified natural rubber preferably has a phosphorus content of 200 ppm or less, more preferably 150 ppm or less. If the phosphorus content is more than 200 ppm, Mooney viscosity may increase during storage so that processability may deteriorate, and tan δ may increase so that fuel economy cannot be improved. The phosphorus content can be measured by conventional methods, such as ICP emission analysis. The phosphorus is presumably derived from phospholipids in natural rubber.

When the modified natural rubber contains an artificial antioxidant, it preferably has a nitrogen content of 0.15% by mass or less, more preferably 0.1% by mass or less, as determined after it is immersed in acetone at room temperature (25° C.) for 48 hours. If the nitrogen content is more than 0.15% by mass, Mooney viscosity may increase during storage so that processability may deteriorate, and the effect of improving fuel economy may be insufficiently produced. Highly purified natural rubber is free of natural antioxidant components that natural rubber is thought to contain by nature, and thus it may deteriorate during long-term storage. For this reason, artificial antioxidants may be added to highly purified natural rubber. The nitrogen content is measured after artificial antioxidants in the rubber are removed by extraction with acetone. The nitrogen content can be measured by conventional methods, such as the Kjeldahl method or a measurement with a trace nitrogen analyzer. The nitrogen is derived from proteins and amino acids.

The modified natural rubber preferably has a Mooney viscosity ML (1+4) at 130° C. of 75 or less, more preferably 40 to 75, still more preferably 45 to 75, particularly preferably 50 to 70, most preferably 55 to 65, as measured in conformity with JIS K 6300:2001-1. The modified natural rubber having a Mooney viscosity of 75 or less does not need mastication which is usually necessary before kneading of rubber. Thus, the modified natural rubber, which is prepared without the mastication process, can be suitably used as a material to be compounded into rubber compositions. In contrast, the modified natural rubber having a Mooney viscosity of more than 75 needs mastication before use and thus tends to cause problems such as the need of dedicated equipment, a loss of electricity or thermal energy, and the like.

With respect to the Mooney viscosity ML (1+4) at 130° C. mentioned above, the modified natural rubber preferably has a heat-aging resistance index defined by the following formula of 75 to 120%, $$\text{Heat-aging resistance index (\%)} = \frac{\text{Mooney viscosity of the modified natural rubber determined after 18-hour heat treatment at 80° C.}}{\text{Mooney viscosity of the modified natural rubber before the treatment}} \times 100.$$

The heat-aging resistance index defined by the formula is more preferably 80 to 115%, still more preferably 85 to 110%. Although various methods for evaluating the heat-aging resistance of rubber are reported, heat-aging resistance, such as during the production or service of tires, can be accurately evaluated by the method of evaluating a rate of change in the Mooney viscosity ML (1+4) at 130° C. between before and after heat treatment at 80° C. for 18 hours. A heat-aging resistance index within the range mentioned above results in excellent heat-aging resistance and in a marked improvement in the balance of the properties including fuel economy and heat-aging resistance.

The highly purified, modified natural rubber whose pH is adjusted to 2 to 7 according to the present invention, such as the rubbers (1) to (3), can be prepared by, for example, a production method 1 or a production method 2. The production method 1 includes: Step 1-1 of saponifying natural rubber latex; Step 1-2 of washing the saponified natural rubber latex; and Step 1-3 of treating the washed latex with an acidic compound. The production method 2 includes: Step 2-1 of deproteinizing natural rubber latex; Step 2-2 of washing the deproteinized natural rubber latex; and Step 2-3 of treating the washed latex with an acidic compound.

[Production Method 1]
(Step 1-1)

Step 1-1 includes saponifying natural rubber latex. This treatment decomposes phospholipids and proteins in the rubber, thereby providing a saponified natural rubber latex containing a reduced amount of non-rubber components.

Natural rubber latex is collected as sap of natural rubber trees such as hevea trees. It contains components including water, proteins, lipids, inorganic salts as well as a rubber component. The gel fraction in rubber is considered to be derived from a complex of various impurities in the rubber. In the present invention, the natural rubber latex to be used may be a raw latex (field latex) taken from hevea trees by tapping, or a concentrated latex (e.g. purified latex; high-ammonia latex in which ammonia is added by a usual method; and LATZ latex which is stabilized with zinc oxide, TMTD, and ammonia) concentrated by centrifugation or creaming.

The saponification can be suitably carried out by methods disclosed in, for example, JP 2010-138359 A and JP 2010-174169 A, and specifically may be carried out as follows, for example.

The saponification may be carried out by adding an alkali and optionally a surfactant to natural rubber latex for a certain period of time at a predetermined temperature, followed by still standing. Stirring or the like may be performed as needed.

The alkali to be used in the saponification is preferably, but not limited to, sodium hydroxide, potassium hydroxide, or the like. The surfactant is not particularly limited, and examples include known anionic surfactants such as polyoxyethylene alkyl ether sulfates, nonionic surfactants, and amphoteric surfactants. Suitable are anionic surfactants such as polyoxyethylene alkyl ether sulfates because they can enable good saponification without solidifying rubber. In the saponification, the amounts of the alkali and the surfactant, and the temperature and duration of the saponification may be appropriately adjusted.

(Step 1-2)

Step 1-2 includes washing the saponified natural rubber latex obtained in Step 1-1. Non-rubber components such as proteins are removed by the washing.

For example, Step 1-2 can be carried out by coagulating the saponified natural rubber latex obtained in Step 1-1 to produce a coagulated rubber, treating the coagulated rubber with a basic compound, and then washing the resultant rubber. Specifically, after a coagulated rubber is prepared, it is diluted with water to transfer the water-soluble components to the aqueous phase, and then water is removed, so that the non-rubber components can be removed. Further, the treatment with a basic compound after coagulation allows for redissolution of non-rubber components which have been trapped inside the rubber during the coagulation. Thus, non-rubber components such as proteins firmly attached inside the coagulated rubber can be removed.

For example, an exemplary coagulation method includes adding an acid, such as formic acid, acetic acid, or sulfuric acid, to adjust the pH, and optionally further adding a polymer flocculant. This does not produce large coagula but a particulate rubber having a diameter in the order of at least a few millimeters to 1 mm to 20 mm. Then, proteins and the like are sufficiently removed by the treatment with a basic compound. The pH is preferably adjusted within the range of 3.0 to 5.0, more preferably 3.5 to 4.5.

Examples of the polymer flocculants include cationic polymer flocculants such as poly(dimethylaminoethyl (meth)acrylate methyl chloride quaternary salt); anionic polymer flocculants such as poly(acrylic acid salt); nonionic polymer flocculants such as polyacrylamide; and amphoteric polymer flocculants such as a copolymer of a dimethylaminoethyl (meth)acrylate methyl chloride quaternary salt and an acrylic acid salt. The amount of the polymer flocculant may be appropriately chosen.

Then, the coagulated rubber thus obtained is treated with a basic compound. The basic compound is not particularly limited and is suitably a basic inorganic compound because of its ability to remove proteins and the like.

Examples of the basic inorganic compounds include: metal hydroxides such as alkali metal hydroxides and alkaline earth metal hydroxides; metal carbonates such as alkali metal carbonates and alkaline earth metal carbonates; metal hydrogen carbonates such as alkali metal hydrogen carbonates; metal phosphates such as alkali metal phosphates; metal acetates such as alkali metal acetates; metal hydrides such as alkali metal hydrides; and ammonia.

Examples of the alkali metal hydroxides include lithium hydroxide, sodium hydroxide, and potassium hydroxide. Examples of the alkaline earth metal hydroxides include magnesium hydroxide, calcium hydroxide, and barium hydroxide. Examples of the alkali metal carbonates include lithium carbonate, sodium carbonate, and potassium carbonate. Examples of the alkaline earth metal carbonates include magnesium carbonate, calcium carbonate, and barium carbonate. Examples of the alkali metal hydrogen carbonates include lithium hydrogen carbonate, sodium hydrogen carbonate, and potassium hydrogen carbonate. Examples of the alkali metal phosphates include sodium phosphate and sodium hydrogen phosphate. Examples of the alkali metal acetates include sodium acetate and potassium acetate. Examples of the alkali metal hydrides include sodium hydride and potassium hydride.

Preferred among these are metal hydroxides, metal carbonates, metal hydrogen carbonates, metal phosphates, and ammonia, more preferably alkali metal carbonates, alkali metal hydrogen carbonates, and ammonia, still more preferably sodium carbonate and sodium hydrogen carbonate. The basic compounds may be used alone, or two or more of these may be used in combination.

The method of treating the coagulated rubber with a basic compound is not particularly limited, as long as the coagulated rubber is brought in contact with the basic compound. Examples include a method in which the coagulated rubber is immersed in an aqueous solution of the basic compound; and a method in which an aqueous solution of the basic compound is sprayed onto the coagulated rubber. The aqueous solution of the basic compound can be prepared by diluting and dissolving the basic compound with water.

The amount of the basic compound is preferably 0.1% by mass or more, more preferably 0.3% by mass or more, based on 100% by mass of the aqueous solution. If the amount is less than 0.1% by mass, proteins may not be sufficiently removed. The amount is preferably 10% by mass or less, more preferably 5% by mass or less. If the amount is more than 10% by mass, in spite of a large amount of the basic compound required, the amount of decomposed proteins tends not to be increased, thus resulting in poor efficiency.

The aqueous solution of the basic compound preferably has a pH of 9 to 13, and in view of treatment efficiency, it more preferably has a pH of 10 to 12.

The treatment temperature may be appropriately chosen and it is preferably 10° C. to 50° C., and more preferably 15° C. to 35° C. Moreover, the treatment duration is usually 1 minute or longer, preferably 10 minutes or longer, and more preferably 30 minutes or longer. If the duration is shorter than 1 minute, the effects of the present invention may not be well achieved. Although the upper limit is not limited, from a standpoint of productivity, it is preferably 48 hours or shorter, more preferably 24 hours or shorter, and further preferably 16 hours or shorter.

Washing is performed after the treatment with a basic compound. This washing treatment allows for sufficient removal of non-rubber components such as proteins which have been trapped inside the rubber during the coagulation, and at the same time allows for sufficient removal of basic compounds present inside the coagulated rubber as well as those on the surface. In particular, the removal of basic compounds remaining in the entire rubber by the washing allows the entire rubber to be sufficiently treated with an acidic compound as mentioned later. Thus, the pH of not only the surface but also the inside of the rubber can be adjusted to 2 to 7.

The washing can be suitably carried out by methods which can sufficiently remove non-rubber components and basic compounds contained in the entire rubber. For example, the washing may be carried out by a method in which the rubber component is diluted and washed with water, followed by centrifugation or by a method in which such a rubber component is left standing still to allow the rubber to float, and then only the aqueous phase is drained to remove the rubber component. The number of washing cycles may be optional as long as the amounts of non-rubber components such as proteins and of the basic compound can be reduced to desired levels. In the case of repeating a washing cycle which includes adding 1000 mL of water to each 300 g of dry rubber, stirring the mixture, and then removing water, the number of washing cycles is preferably 3 (3 cycles) or more, more preferably 5 (5 cycles) or more, still more preferably 7 (7 cycles) or more.

The washing is preferably performed until the rubber has a phosphorus content of 200 ppm or less and/or has a nitrogen content of 0.15% by mass or less. If phospholipids and proteins are sufficiently removed by the washing treatment, then fuel economy and processability are improved.
(Step 1-3)

Step 1-3 includes treating the washed rubber obtained in Step 1-2 with an acidic compound. This treatment adjusts the pH of the entire rubber to a pH of 2 to 7 as explained above, thereby providing a modified natural rubber excellent in the aforementioned properties. Although heat-aging resistance tends to be reduced by the treatment with a basic compound and the like, an additional treatment with an acidic compound prevents such a problem, thus resulting in good heat-aging resistance.

Examples of the acidic compounds include, but not limited to, inorganic acids such as hydrochloric acid, nitric acid, sulfuric acid, phosphoric acid, polyphosphoric acid, metaphosphoric acid, boric acid, boronic acid, sulfanilic acid, and sulfamic acid; and organic acids such as formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutamic acid, salicylic acid, methanesulfonic acid, itaconic acid, benzenesulfonic acid, toluenesulfonic acid, naphthalenedisulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, α-resorcylic acid, β-resorcylic acid, γ-resorcylic acid, gallic acid, phloroglycine, sulfosalicylic acid, ascorbic acid, erythorbic acid, and bisphenolic acids. Preferred among these are acetic acid, sulfuric acid, formic acid and the like. The acidic compounds may be used alone, or two or more of these may be used in combination.

The method of treating the coagulated rubber with acid is not particularly limited, as long as the coagulated rubber is brought in contact with the acidic compound. Examples include a method in which the coagulated rubber is immersed in an aqueous solution of the acidic compound; and a method in which an aqueous solution of the acidic compound is sprayed onto the coagulated rubber. The aqueous solution of the acidic compound can be prepared by diluting and dissolving the acidic compound with water.

Although the amount of the acidic compound based on 100% by mass of the aqueous solution is not particularly limited, the lower limit is preferably 0.1% by mass or more, more preferably 0.3% by mass or more, while the upper limit is preferably 15% by mass or less, more preferably 10% by mass or less, still more preferably 5% by mass or less. When the amount falls within the range mentioned above, good heat-aging resistance can be achieved.

The treatment temperature may be appropriately chosen and it is preferably 10° C. to 50° C., more preferably 15° C. to 35° C. Moreover, typically, the treatment duration is preferably 3 seconds or longer, more preferably 10 seconds or longer, still more preferably 30 seconds or longer. If the duration is shorter than 3 seconds, the rubber may not be sufficiently neutralized and thus the effects of the present invention may not be well achieved. Although the upper limit is not limited, from a standpoint of productivity, it is preferably 24 hours or shorter, more preferably 10 hours or shorter, still more preferably 5 hours or shorter.

In the treatment such as immersing the rubber in an aqueous solution of the acidic compound, the pH is preferably adjusted to 6 or lower. Such neutralization results in excellent heat-aging resistance. The upper limit of the pH is more preferably 5 or lower, still more preferably 4.5 or lower. The lower limit of the pH is not particularly limited, and it is preferably 1 or higher, more preferably 2 or higher, because too strong acidity may cause deterioration of the rubber and some trouble in the wastewater disposal, though depending on the duration of immersion. The immersing treatment can be carried out, for example, by leaving the coagulated rubber in an aqueous solution of the acidic compound.

After the compound used in the treatment with an acidic compound is removed following the treatment, the treated coagulated rubber may appropriately be washed. The washing may be carried out in the same manner as the above-described methods. For example, the amounts of non-rubber components may be further reduced and adjusted to desired levels by repeating washing. Moreover, the coagulated rubber after the treatment with an acidic compound may be squeezed with, for example, a roll squeezer into a sheet shape. The additional step of squeezing the coagulated rubber allows the surface and inside of the coagulated rubber to have a uniform pH, and thus the resulting rubber has desired properties. After performing the washing and squeezing steps as needed, the resultant rubber is milled on a creper and dried so that the modified natural rubber of the present invention can be obtained. The drying may be carried out in any manner, such as by using a common drier for drying TSR, such as a trolley dryer, a vacuum dryer, an air dryer, or a drum dryer.

[Production Method 2]
(Step 2-1)

Step 2-1 includes deproteinizing natural rubber latex. This treatment produces a deproteinized natural rubber latex free of non-rubber components such as proteins. The natural rubber latex to be used in Step 2-1 may be the same as described above.

The deproteinizing treatment may be carried out by any known method by which proteins can be removed. An exemplary method includes adding a proteolytic enzyme to natural rubber latex to decompose proteins.

The proteolytic enzyme to be used in the deproteinizing treatment may be, but is not limited to, any of a bacteria-derived enzyme, a mold-derived enzyme, and an yeast-derived enzyme. Specifically, one or a combination of proteases, peptidases, cellulases, pectinases, lipases, esterases, amylases, and the like may be used.

The amount of the proteolytic enzyme to be added is preferably 0.005 parts by mass or more, more preferably 0.01 parts by mass or more, still more preferably 0.05 parts by mass or more, relative to 100 parts by mass of solids of the natural rubber latex. An amount of less than the lower limit may result in an insufficient proteolytic reaction.

A surfactant may also be added together with the proteolytic enzyme in the deproteinizing treatment. Examples of the surfactants include anionic surfactants, cationic surfactants, nonionic surfactants, and amphoteric surfactants.
(Step 2-2)

Step 2-2 includes washing the deproteinized natural rubber latex obtained in Step 2-1. Non-rubber components such as proteins are removed by the washing.

Step 2-2 may be carried out, for example, by coagulating the deproteinized natural rubber latex obtained in Step 2-1 to prepare a coagulated rubber, and washing the coagulated rubber. Thus, non-rubber components such as proteins firmly attached inside the coagulated rubber can be removed.

The coagulation may be carried out in the same manner as in Step 1-2. Further, the treatment with a basic compound as described above may optionally be performed. After a coagulated rubber is prepared, washing is performed. This washing treatment may be carried out in the same manner as in Step 1-2, so that non-rubber components such as proteins and the basic compound can be removed. For the same reason as described above, the washing may preferably be performed until the rubber has a phosphorus content of 200 ppm or less and/or has a nitrogen content of 0.15% by mass or less.

(Step 2-3)

Step 2-3 includes treating the washed rubber obtained in Step 2-2 with an acidic compound. Not only the treatment with a basic compound but also the acid coagulation using a small amount of acid tend to reduce heat-aging resistance due to the fact that a water extract of the rubber finally obtained shows alkalinity or neutrality. Enzymes having an optimum pH in an alkali region are usually used as the proteolytic enzyme because they suitably enable deproteinization. Such an enzymatic reaction is often carried out under alkaline conditions depending on the optimum pH. To adjust the pH of the final rubber to 2 to 7, natural rubber latex is preferably deproteinized at a pH of 8.5 to 11 in Step 2-1. The deproteinized latex is then solidified under acidic conditions in the coagulation. When the solidified rubber was washed only with water, an extract obtained from the rubber as described later had a higher pH than the pH of an extracting solvent, and such a rubber showed a great reduction particularly in heat-aging resistance. In contrast, if the solidified rubber is treated with an acidic compound, optionally after the treatment with a basic compound, the above problem can be prevented and thus good heat-aging resistance can be achieved.

The same acidic compounds as mentioned in Step 1-3 can be used. Moreover, the method of treating the coagulated rubber with acid is not particularly limited, as long as the coagulated rubber is brought in contact with the acidic compound. Examples include a method in which the coagulated rubber is immersed in an aqueous solution of the acidic compound; and a method in which an aqueous solution of the acidic compound is sprayed onto the coagulated rubber. The aqueous solution of the acidic compound can be prepared by diluting and dissolving the acidic compound with water.

Although the amount of the acidic compound based on 100% by mass of the aqueous solution is not particularly limited, the lower limit is preferably 0.01% by mass or more, more preferably 0.03% by mass or more, while the upper limit is preferably 15% by mass or less, more preferably 10% by mass or less, still more preferably 5% by mass or less. When the amount falls within the range mentioned above, good heat-aging resistance can be achieved.

The temperature and duration for the treatment may be appropriately chosen. The treatment may be carried out at the same temperature as in Step 1-3. Moreover, in the treatment such as immersing the rubber in an aqueous solution of the acidic compound, the pH is preferably adjusted to the same range as in Step 1-3.

After the compound used in the treatment with an acidic compound is removed following the treatment, the treated coagulated rubber may appropriately be washed. The washing may be carried out in the same manner as the above-described methods. For example, the amounts of non-rubber components may be further reduced and adjusted to desired levels by repeating washing. After the washing treatment, the resultant rubber is dried so that the modified natural rubber of the present invention can be obtained. The drying may be carried out in any manner, for example, by the above-mentioned techniques.

[Tire Rubber Composition]

The tire rubber composition of the present invention includes a rubber component, and carbon black and/or a white filler, and the rubber component includes a predetermined amount of the above-described modified natural rubber.

In the rubber composition of the present invention, the amount of the modified natural rubber is 5% by mass or more, preferably 50% by mass or more, more preferably 80% by mass or more, based on 100% by mass of the rubber component. If the amount is less than 5% by mass, excellent fuel economy may not be achieved.

Examples of materials that may be used as the rubber component, other than the modified natural rubber, include natural rubber (non-modified) (NR), epoxidized natural rubber (ENR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), and acrylonitrile-butadiene rubber (NBR).

The rubber composition of the present invention includes carbon black and/or a white filler, thereby providing a reinforcing effect.

The carbon black preferably has a nitrogen adsorption specific surface area ($N_2SA$) of 70 $m^2/g$ or larger, more preferably 100 $m^2/g$ or larger. If the $N_2SA$ is smaller than 70 $m^2/g$, a sufficient reinforcing effect tends not to be achieved. The $N_2SA$ of carbon black is preferably 300 $m^2/g$ or smaller, more preferably 250 $m^2/g$ or smaller. If the $N_2SA$ is larger than 300 $m^2/g$, fuel economy tends to be reduced. The nitrogen adsorption specific surface area of carbon black can be determined by the method A of JIS K 6217.

Examples of the white fillers include those commonly used in the rubber industry, for example, silica, calcium carbonate, mica such as sericite, aluminum hydroxide, magnesium oxide, magnesium hydroxide, clay, talc, alumina, and titanium oxide. Silica is especially preferred among these in view of fuel economy.

The silica is not particularly limited. Examples of the silica include dry silica (anhydrous silica) and wet silica (hydrous silica). Wet silica is preferred as it has many silanol groups.

The silica preferably has a nitrogen adsorption specific surface area ($N_2SA$) of 40 $m^2/g$ or more, more preferably 80 $m^2/g$ or more, still more preferably 100 $m^2/g$ or more. The silica with a $N_2SA$ of less than 40 $m^2/g$ tends to provide reduced breaking resistance after vulcanization. The nitrogen adsorption specific surface area ($N_2SA$) of silica is preferably 300 $m^2/g$ or less, more preferably 250 $m^2/g$ or less, still more preferably 200 $m^2/g$ or less. The silica with a $N_2SA$ of more than 300 $m^2/g$ tends to lead to reduced fuel economy and reduced rubber processability. The $N_2SA$ of silica is determined by the BET method in conformity with ASTM D3037-81.

The amount of carbon black per 100 parts by mass of the rubber component is preferably 10 parts by mass or more, more preferably 30 parts by mass or more. The amount is preferably 150 parts by mass or less, more preferably 100 parts by mass or less. When the amount of carbon black falls within the range mentioned above, good fuel economy can be achieved.

The amount of silica per 100 parts by mass of the rubber component is preferably 10 parts by mass or more, more preferably 30 parts by mass or more. The amount is preferably 150 parts by mass or less, more preferably 100 parts by mass or less. When the amount of silica falls within the range mentioned above, good fuel economy can be achieved.

In the rubber composition of the present invention, the combined amount of carbon black and white filler, per 100 parts by mass of the rubber component, is preferably 10 parts by mass or more, more preferably 30 parts by mass or more. The combined amount is preferably 150 parts by mass or less, more preferably 100 parts by mass or less. When the combined amount falls within the range mentioned above, good fuel economy can be achieved.

In addition to the above materials, the rubber composition of the present invention may appropriately contain various materials commonly used in the rubber industry, such as zinc oxide, stearic acid, various types of antioxidants, softening agents (e.g. oil, wax), vulcanizing agents (e.g. sulfur, organic peroxides), and vulcanization accelerators (e.g. sulfenamide vulcanization accelerators, guanidine vulcanization accelerators).

If the rubber composition of the present invention contains carbon black, the radius of gyration of a cluster of the carbon black is preferably 300 nm or less, more preferably 280 nm or less, still more preferably 270 nm or less, particularly preferably 260 nm or less. When the radius of gyration is 300 nm or less, both fuel economy and breaking resistance can be provided. The lower limit of the radius of gyration is not particularly limited.

If the rubber composition of the present invention contains silica, the radius of gyration of a cluster of the silica is preferably 600 nm or less, more preferably 580 nm or less, still more preferably 570 nm or less, particularly preferably 560 nm or less. When the radius of gyration is 600 nm or less, both fuel economy and breaking resistance can be provided. The lower limit of the radius of gyration is not particularly limited.

The radius of gyration is preferably determined by X-ray scattering analysis or neutron scattering analysis, in which the rubber composition to be measured is irradiated with X-rays or neutrons.

The X-ray scattering analysis may suitably be small-angle X-ray scattering (SAXS) analysis (scattering angle: typically 10 degrees or smaller) in which a polymer material is irradiated with X-rays to measure the scattering intensity. In the small-angle X-ray scattering, structural information of a substance can be obtained by measuring the X-rays scattered at small scattering angles among the scattered X-rays resulting from the irradiation of the substance with X-rays. In this way, ordered structures on the order of a few nanometers, such as microphase-separated structures, of polymer materials can be analyzed.

To obtain detailed molecular structural information, the SAXS analysis can desirably measure an X-ray scattering profile with a high S/N ratio. For this reason, the X-rays radiated from a synchrotron preferably have a brilliance of at least $10^{10}$ (photons/s/mrad$^2$/mm$^2$/0.1% bw). The symbol bw represents the band width of X-rays radiated from a synchrotron. Examples of such synchrotrons include the beamline BL03XU and BL20XU of the large synchrotron radiation facility "SPring-8" belonging to Japan Synchrotron Radiation Research Institute.

The brilliance (photons/s/mrad$^2$/mm$^2$/0.1% bw) of the X-rays is preferably $10^{10}$ or higher, more preferably $10^{12}$ or higher. The upper limit is not particularly limited, and the X-ray intensity used is preferably low enough not to cause radiation damage.

The number of photons (photons/s) in the X-rays is preferably $10^7$ or more, more preferably $10^9$ or more. The upper limit is not particularly limited, and the X-ray intensity used is preferably low enough not to cause radiation damage.

The neutron scattering analysis may suitably be small-angle neutron scattering (SANS) analysis (scattering angle: typically 10 degrees or smaller) in which a polymer material is irradiated with neutrons to measure the scattering intensity. In the small-angle neutron scattering, structural information of a substance can be obtained by measuring the neutrons scattered at small scattering angles among the scattered neutrons resulting from the irradiation of the substance with neutrons. In this way, ordered structures on the order of a few nanometers, such as microphase-separated structures, of polymer materials can be analyzed.

The SANS analysis may employ known magnetic structure-based techniques or deuteration techniques. When a deuteration technique is used, for example, a polymer material is swollen in a deuterated solvent, and the polymer material in equilibrium in the deuterated solvent is irradiated with neutrons to measure the scattering intensity. Examples of the deuterated solvents for swelling polymer materials include heavy water, deuterated hexane, deuterated toluene, deuterated chloroform, deuterated methanol, deuterated DMSO (($D_3C)_2S=O$), deuterated tetrahydrofuran, deuterated acetonitrile, deuterated dichloromethane, deuterated benzene, and deuterated N,N-dimethylformamide.

The neutrons for use in the neutron scattering analysis such as SANS can be obtained from, for example, the SANS-J beamline at the JRR-3 research reactor belonging to Japan Atomic Energy Agency, Independent Administrative Agency.

The flux density (neutrons/cm$^2$/s) of the neutrons is preferably $10^3$ or higher, more preferably $10^4$ or higher, because then a neutron scattering profile with a high S/N ratio can be obtained as in the case with the SAXS analysis. The upper limit is not particularly limited, and the neutron flux density employed is preferably low enough not to cause radiation damage.

In the X-ray or neutron scattering analysis, since finer molecular structures of polymer materials need to be measured, the analysis is preferably carried out using the X-rays or neutrons under conditions where q defined by the Formula 1 below is in a range of 10 nm$^{-1}$ or less. This q range (nm$^{-1}$) is desirable because a greater numerical value provides smaller pieces of information. Thus, the q is more preferably in a range of 20 nm$^{-1}$ or less.

$$q = \frac{4\pi \sin(\theta/2)}{\lambda} \quad \text{(Formula 1)}$$

wherein θ is the scattering angle; and λ is the wavelength of X-rays or neutrons.

The X-rays scattered in the SAXS analysis are detected by an X-ray detector, and an image is then generated by an image processor or the like using the X-ray detection data from the X-ray detector.

Examples of the X-ray detectors include two-dimensional detectors such as X-ray films, nuclear emulsion plates, X-ray image pickup tubes, X-ray fluorescent amplifiers, X-ray image intensifiers, X-ray imaging plates, X-ray CCDs, and X-ray amorphous materials; and line sensor one-dimensional detectors. The X-ray detector may be appropriately selected depending on the type and conditions of a polymer material to be analyzed, and the like.

The image processor may appropriately be a common one that can generate X-ray scattering images based on X-ray detection data from an X-ray detector.

The SANS analysis can also be carried out based on the same principle as in the SAXS analysis; the neutrons scattered are detected by a neutron detector, and an image is then generated by an image processor or the like using the neutron detection data from the neutron detector. Similarly as above, the neutron detector may be a known two-dimensional detector or one-dimensional detector, and the image processor may be a known one that can generate neutron scattering images. These devices may be appropriately selected.

The following will specifically describe the analysis of scattering intensity curves obtained by the X-ray scattering analysis or neutron scattering analysis of polymer materials.

For example, scattering intensity curves obtained by the SAXS or SANS analysis of a polymer material containing both a metal atom and a metal-coordinating functional group or a polymer material containing a filler can be analyzed by the methods described below to determine the radius of gyration ($R_g$) of a cluster (scatterer) with a size of 1 nm to 100 μm.

Figure 2:
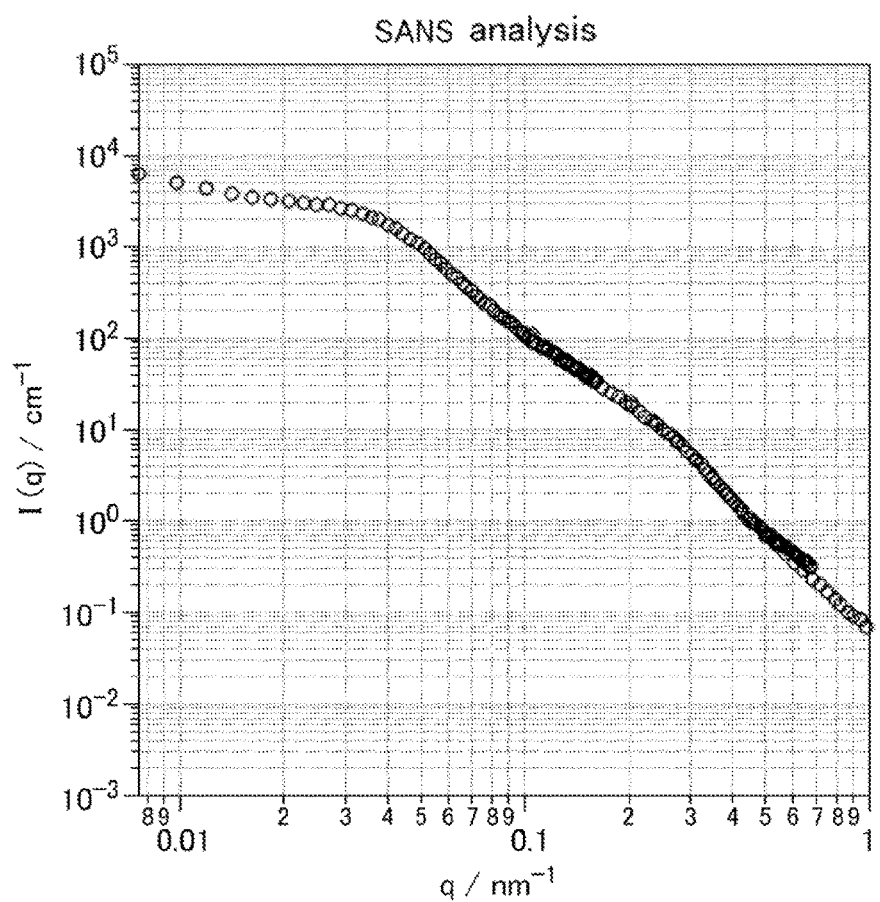
FIG. 2 shows an example of a scattering intensity curve of a sample of an example as determined by SANS analysis.

The scattering intensity curve I(q) obtained by the SAXS or SANS analysis as shown in FIG. 1 or FIG. 2, for example, is curve fitted with the following Formula 2 and Formula 3, and the fitting parameters are then determined by least squares.

$$I_{(q)} = \sum_{i=1}^{n} \left\{ P_i \left[ \left\{ \text{erf}\left(\frac{qR_{gi}}{\sqrt{6}}\right)^3 / q \right\} \right]^{D_{fi}} \exp\left(\frac{-q^2 R_{g(i+1)}^2}{3}\right) + \right. $$
$$G_i \exp\left(\frac{-q^2 R_{g(i+1)}^2}{3}\right) \right\} + $$
$$P_{n+1}\left[\left\{\text{erf}\left(\frac{qR_{g(n+1)}}{\sqrt{6}}\right)^3 / q\right\}\right]^{D_{f(n+1)}}$$
(Formula 2)

$$\text{erf}(z) = \frac{2}{\sqrt{\pi}} \int_0^z e^{-t^2} dt$$
(Formula 3)

wherein $P_i$, $G_i$, $R_{gi}$, and $D_{fi}$ are fitting parameters; n is an integer; q is as defined above; and z and t are any positive numbers.

Among the fitting parameters determined, the radius of gyration $R_g$ of a molecular structure with a size of 1 nm to 100 μm is presumed to correspond to the radius of gyration of a cluster formed by aggregation of metal atoms or fillers. As mentioned above, since the radius of gyration $R_g$ highly correlates with energy loss, i.e., a smaller $R_g$ results in lower energy loss, the $R_g$ is considered to greatly affect energy loss. Thus, the energy loss in polymer materials can be evaluated by performing X-ray scattering analysis, such as SAXS, or neutron scattering analysis, such as SANS, followed by curve fitting with Formula 2 and Formula 3 to determine the $R_g$.

The maximum radius of gyration $R_g$ among the radii of gyration obtained is defined as the radius of gyration used in the present invention.

The rubber composition of the present invention can be prepared by known methods. For example, the rubber composition may be prepared by kneading the components with a rubber kneading device such as an open roll mill or a Banbury mixer and subsequently vulcanizing the kneaded mixture.

The rubber composition of the present invention can suitably be used for various tire components, such as a cap tread, a base tread, an undertread, a clinch apex, a bead apex, a sidewall, a breaker, an edge band, a full band, a breaker cushion rubber, a rubber for coating carcass cords, a run-flat reinforcing layer, an insulation, a chafer, or an innerliner, as well as belts, rolls, and the like.

The tire of the present invention can be formed using the above-described rubber composition by conventional methods. Specifically, a tire may be formed by extruding the unvulcanized rubber composition containing materials as appropriate, according to the shape of a tire component, such as a tread; forming the extrudate on a tire building machine by a conventional method to build an unvulcanized tire; and then heating and pressurizing the unvulcanized tire in a vulcanizer.

The tire of the present invention may be a pneumatic tire, an airless (solid) tire, or the like, preferably a pneumatic tire.

EXAMPLES

The present invention will now be described in detail by reference to, but not limited to, examples.

The chemicals used in the examples are listed below.
Field latex: field latex available from MUHIBBAH LATEKS
EMAL E-27C (surfactant): EMAL E-27C available from Kao Corporation (sodium polyoxyethylene lauryl ether sulfate, active ingredient: 27% by mass)
NaOH: NaOH available from Wako Pure Chemical Industries, Ltd.
Wingstay L (antioxidant): Wingstay L available from ELIOKEM (compound obtained by butylating a condensate of p-cresol and dicyclopentadiene)
Emulvin W (surfactant): Emulvin W available from LANXESS (aromatic polyglycol ether)
Tamol NN 9104 (surfactant): Tamol NN 9104 available from BASF (sodium salt of naphthalenesulfonic acid/formaldehyde)
Van gel B (surfactant): Van gel B available from Vanderbilt (hydrated magnesium aluminum silicate)
TSR: NR (TSR)
Carbon black 1: Diablack I (ISAF class, $N_2SA$: 114 $m^2/g$) available from Mitsubishi Chemical Corporation
Carbon black 2: Diablack LH (N326, $N_2SA$: 84 $m^2/g$) available from Mitsubishi Chemical Corporation
Silica: Ultrasil VN3 ($N_2SA$: 175 $m^2/g$) available from Evonik Degussa
Zinc oxide: zinc oxide #2 available from Mitsui Mining & Smelting Co., Ltd.
Stearic acid: stearic acid beads "Tsubaki" available from NOF Corporation
Oil: Diana Process NH-70S available from Idemitsu Kosan Co., Ltd.
Antioxidant 1: Nocrac 6C available from Ouchi Shinko Chemical Industrial Co., Ltd. (N-phenyl-N'-(1,3-dimethylbutyl)-p-phenylenediamine, 6PPD)
Antioxidant 2: Nocrac RD available from Ouchi Shinko Chemical Industrial Co., Ltd. (poly(2,2,4-trimethyl-1,2-dihydroquinoline))
Insoluble sulfur 1: Seimi Sulfur (oil content: 10%) available from Nippon Kanryu Industry Co., Ltd.
Insoluble sulfur 2: Crystex HSOT20 (oil content: 20%) available from Flexsys Vulcanization accelerator TBBS (NS): Nocceler NS available from Ouchi Shinko Chemical Industrial Co., Ltd.

EXAMPLES AND COMPARATIVE EXAMPLES (Preparation of Antioxidant Dispersion)

An amount of 462.5 g of water was mixed with 12.5 g of Emulvin W, 12.5 g of Tamol NN 9104, 12.5 g of Van gel B, and 500 g of Wingstay L (total amount of mixture: 1000 g) for 16 hours using a ball mill to prepare an antioxidant dispersion.

Production Example 1-1

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5-5 mm. The coagulum was taken out and immersed in 1000 mL of a 2% by mass aqueous solution of sodium carbonate for 4 hours at room temperature, and then the rubber was taken out. The obtained rubber was combined with 2000 mL of water and the mixture was stirred for 2 minutes and then dehydrated as much as possible. This cycle of operation was repeated seven times. Thereafter, 500 mL of water was added, and 2% by mass formic acid was added until the pH reached 4, followed by leaving the mixture for 15 minutes. Then, the mixture was dehydrated as much as possible and combined with water again, and the mixture was stirred for 2 minutes. This cycle of operation was repeated three times. Then water was squeezed off from the resultant rubber with a water squeezing roll to form the rubber into a sheet, followed by drying for 4 hours at 90° C. In this manner, a solid rubber was prepared.

Production Example 1-2

A solid rubber was prepared as in Production Example 1-1, except that 2% by mass formic acid was added until the pH reached 1.

Production Example 1-3

A solid rubber was prepared as in Production Example 1-1, except that 2% by mass formic acid was added until the pH reached 2.

Production Example 1-4

A solid rubber was prepared as in Production Example 1-1, except that 2% by mass formic acid was added until the pH reached 3.

Production Example 1-5

A solid rubber was prepared as in Production Example 1-1, except that 2% by mass formic acid was added until the pH reached 5.

Production Example 1-6

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5-3 mm. The coagulum was taken out and immersed in 1000 mL of a 2% by mass aqueous solution of sodium carbonate for 4 hours at room temperature, and then the rubber was taken out. The obtained rubber was combined with 1000 mL of water and the mixture was stirred for 2 minutes and then dehydrated as much as possible. This cycle of operation was repeated seven times. Thereafter, 500 mL of water was added, and 2% by mass formic acid was added until the pH reached 4, followed by stirring for 30 minutes. The resultant rubber was formed into a sheet using a creper while pouring water, followed by drying for 4 hours at 90° C. In this manner, a solid rubber was prepared.

Production Example 1-7

A solid rubber was prepared as in Production Example 1-6, except that the operation of combining the rubber with 1000 mL of water, stirring the mixture for 2 minutes, and dehydrating it as much as possible was repeated three times.

Production Example 1-8

A solid rubber was prepared as in Production Example 1-6, except that the operation of combining the rubber with 1000 mL of water, stirring the mixture for 2 minutes, and dehydrating it as much as possible was repeated five times.

Production Example 1-9

A solid rubber was prepared as in Production Example 1-6, except for the following differences: The coagulum obtained after adding a cationic polymer flocculant was immersed in 1000 mL of a 1% by mass aqueous solution of sodium carbonate for 30 minutes at room temperature, and then the rubber was taken out; and the obtained rubber was combined with 1000 mL of water and the mixture was stirred for 2 minutes and then dehydrated as much as possible, which cycle of operation was repeated seven times.

Production Example 1-10

A solid rubber was prepared as in Production Example 1-6, except for the following differences: The coagulum obtained after adding a cationic polymer flocculant was not treated with the aqueous solution of sodium carbonate, but was directly combined with 1000 mL of water and the mixture was stirred for 2 minutes and then dehydrated as much as possible, which cycle of operation was repeated seven times.

Comparative Production Example 1-1

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 3-15 mm. The coagulum was taken out and immersed in 1000 mL of a 2% by mass aqueous solution of sodium carbonate for 4 hours at room temperature, and then the rubber was taken out. The obtained rubber was combined with 1000 mL of water and the mixture was stirred for 2 minutes and then dehydrated as much as possible. This operation was performed once. Thereafter, 500 mL of water was added, and 2% by mass formic acid was added until the pH reached 4, followed by stirring for 15 minutes. Then, the mixture was dehydrated as much as possible and combined with water again, and the mixture was stirred for 2 minutes. This cycle of operation was repeated three times, followed by drying for 4 hours at 90° C. In this manner, a solid rubber was prepared.

Comparative Production Example 1-2

A solid rubber was prepared as in Production Example 1-1, except that, after the treatment with the aqueous solution of sodium carbonate was performed and water washing was repeated seven times, the resultant rubber was not subjected to the acidic treatment with 2% by mass formic acid, but water was squeezed off from the resultant rubber with a water squeezing roll to form the rubber into a sheet.

Comparative Production Example 1-3

After the solids concentration (DRC) of field latex was adjusted to 30% (w/v), 1000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for 2 hours, and then water was further added to dilute the mixture until the rubber concentration reached 15% (w/v). Then, formic acid was added with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5-3 mm. The coagulum was taken out and immersed in 1000 mL of a 2% by mass aqueous solution of sodium carbonate for 4 hours at room temperature, and then the rubber was taken out. The obtained rubber was combined with 1000 mL of water and the mixture was stirred for 2 minutes and then dehydrated as much as possible. This operation was performed once. Thereafter, 500 mL of water was added, and 2% by mass formic acid was added until the pH reached 4, followed by stirring for 15 minutes. Then, the mixture was dehydrated as much as possible and combined with water again, and the mixture was stirred for 2 minutes. This cycle of operation was repeated three times. The resultant rubber was formed into a sheet using a creper, followed by drying for 4 hours at 90° C. In this manner, a solid rubber was prepared.

Comparative Production Example 1-4

A solid rubber was prepared as in Comparative Production Example 1-3, except for the following differences: After the coagulum was immersed in 1000 mL of a 2% by mass aqueous solution of sodium carbonate for 4 hours at room temperature, and then the rubber was taken out, the obtained rubber was combined with 1000 mL of water and the mixture was stirred for 2 minutes and then dehydrated as much as possible, which cycle of operation was repeated seven times; and the resultant rubber was formed into a sheet using a creper, followed by drying for 4 hours at 90° C.

Production Example 2-1

A commercially available high-ammonia latex having a solid rubber content of 62.0% from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810) from Kao Corporation to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated twice. The resulting cream fraction was dispersed in distilled water to prepare a deproteinized rubber latex having a solid rubber content of 60%.

To the latex was added 2% by mass formic acid until the pH reached 4. Then a cationic polymer flocculant was added, so that rubber particles having a particle size of 0.5 to 5 mm were obtained. They were dehydrated as much as possible, and water was added in an amount of 50 g per 10 g of the rubber content, and then 2% by mass formic acid was added until the pH reached 3. Thirty minutes later, the rubber was taken out and formed into a sheet using a creper, followed by drying for 4 hours at 90° C. In this manner, a solid rubber was prepared.

Production Example 2-2

A solid rubber was prepared as in Production Example 2-1, except that 2% by mass formic acid was added until the pH reached 1.

Production Example 2-3

A solid rubber was prepared as in Production Example 2-1, except that 2% by mass formic acid was added until the pH reached 2.

Production Example 2-4

A solid rubber was prepared as in Production Example 2-1, except for the following differences: After rubber particles having a particle size of 0.5 to 5 mm were obtained, they were immersed in 1000 mL of a 2% by mass aqueous solution of sodium carbonate for 30 minutes, and the resulting rubber was taken out and combined with water in an amount of 350 g per 100 g of dry rubber, and the mixture was stirred for 2 minutes and then allowed to stand still, followed by removing the aqueous phase as much as possible, which cycle of operation was repeated five times; and thereafter water was added in an amount of 50 g per 10 g of the rubber content, and then 2% by mass formic acid was added until the pH reached 3.

Production Example 2-5

A solid rubber was prepared as in Production Example 2-1, except that 2% by mass formic acid was added until the pH reached 5.

Production Example 2-6

A commercially available high-ammonia latex having a solid rubber content of 62.0% from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810) from Kao Corporation to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated twice. The resulting cream fraction was dispersed in distilled water to prepare a deproteinized rubber latex having a solid rubber content of 60%.

To the latex was added formic acid with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5-3 mm. The coagulum was taken out and immersed in 1000 mL of a 2% by mass aqueous solution of sodium carbonate for 4 hours at room temperature, and then the rubber was taken out.

The obtained rubber was combined with 1000 mL of water and the mixture was stirred for 2 minutes and then dehydrated as much as possible. This cycle of operation was repeated twice. Thereafter, 500 mL of water was added, and 2% by mass formic acid was added until the pH reached 4, followed by stirring for 30 minutes. Then, the resultant rubber was formed into a sheet using a creper, followed by drying for 4 hours at 90° C. In this manner, a solid rubber was prepared.

Production Example 2-7

A commercially available high-ammonia latex having a solid rubber content of 62.0% from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810) from Kao Corporation to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated twice. The resulting cream fraction was dispersed in distilled water to prepare a deproteinized rubber latex having a solid rubber content of 30%.

To the latex was added formic acid with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5-3 mm. The coagulum taken out was combined with 1000 mL of water and the mixture was stirred for 2 minutes and then dehydrated as much as possible. This cycle of operation was repeated seven times. Thereafter, 500 mL of water was added, and 2% by mass formic acid was added until the pH reached 4, followed by stirring for 30 minutes. Then, the resultant rubber was formed into a sheet using a creper, followed by drying for 4 hours at 90° C. In this manner, a solid rubber was prepared.

Production Example 2-8

A commercially available high-ammonia latex having a solid rubber content of 62.0% from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810) from Kao Corporation to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated three times. The resulting cream fraction was dispersed in distilled water to prepare a deproteinized rubber latex having a solid rubber content of 30%.

To the latex was added formic acid with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5-3 mm. The coagulum taken out was immersed in a 1% by mass ammonia aqueous solution for 2 hours at room temperature and then the mixture was dehydrated as much as possible. This cycle of operation was repeated twice. Then, the rubber was combined with 1000 mL of water and the mixture was stirred for 2 minutes and then dehydrated as much as possible. This cycle of operation was repeated seven times. Thereafter, 500 mL of water was added, and 2% by mass formic acid was added until the pH reached 4, followed by stirring for 30 minutes. Then, the resultant rubber was formed into a sheet using a creper, followed by drying for 4 hours at 90° C. In this manner, a solid rubber was prepared.

Production Example 2-9

A commercially available high-ammonia latex having a solid rubber content of 62.0% from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810) from Kao Corporation to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated three times. The resulting cream fraction was dispersed in distilled water to prepare a deproteinized rubber latex having a solid rubber content of 30%.

To the latex was added formic acid with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5-3 mm. The coagulum taken out was immersed in a 2% by mass aqueous solution of sodium carbonate for 2 hours at room temperature and then the mixture was dehydrated as much as possible. This cycle of operation was repeated twice. Then, the rubber was combined with 1000 mL of water and the mixture was stirred for 2 minutes and then dehydrated as much as possible. This cycle of operation was repeated seven times. Thereafter, 500 mL of water was added, and 2% by mass formic acid was added until the pH reached 2, followed by stirring for 30 minutes. Then, the resultant rubber was formed into a sheet using a creper, followed by drying for 4 hours at 90° C. In this manner, a solid rubber was prepared.

Production Example 2-10

A commercially available high-ammonia latex having a solid rubber content of 62.0% from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 0.2% aqueous solution of an anionic surfactant (trade name: EMAL E-27C) from Kao Corporation to adjust the rubber concentration to 8%. The mixture was centrifuged at a rotational speed of 11,000 rpm for 30 minutes. Then, a cream fraction obtained by the centrifugation was dispersed in the 0.2% aqueous solution of EMAL E-27C to adjust the rubber concentration to 8%, followed by centrifugation again at a rotational speed of 11,000 rpm for 30 minutes. This cycle of operation was repeated three times. The resulting cream fraction was dispersed in distilled water to prepare a deproteinized rubber latex having a solid rubber content of 30%.

To the latex was added formic acid with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5-3 mm. The coagulum taken out was immersed in a 2% by mass aqueous solution of sodium carbonate for 2 hours at room temperature and then the mixture was dehydrated as much as possible. This cycle of operation was repeated twice. Then, the rubber was combined with 1000 mL of water and the mixture was stirred for 2 minutes and then dehydrated as much as possible. This cycle of operation was repeated seven times. Thereafter, 500 mL of water was added, and 2% by mass formic acid was added until the pH reached 3, followed by stirring for 30 minutes. Then, the resultant rubber was formed into a sheet using a creper, followed by drying for 4 hours at 90° C. In this manner, a solid rubber was prepared.

Comparative Production Example 2-1

A commercially available high-ammonia latex having a solid rubber content of 62.0% from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810) from Kao Corporation to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated again. The resulting cream fraction was dispersed in distilled water to prepare a deproteinized rubber latex having a solid rubber content of 60%.

To the latex was added 50% by mass formic acid until the rubber was solidified. The solidified rubber was taken out and then formed into a sheet using a creper while being washed with water, followed by drying for 4 hours at 90° C. In this manner, a solid rubber was prepared.

Comparative Production Example 2-2

A solid rubber was prepared as in Comparative Production Example 2-1, except that, after the solidified rubber was taken out, it was immersed in a 0.5% by mass aqueous solution of sodium carbonate for 1 hour, and then the resulting rubber was formed into a sheet using a creper while being washed with water, followed by drying for 4 hours at 90° C.

Comparative Production Example 2-3

A commercially available high-ammonia latex having a solid rubber content of 62.0% from MUHIBBAH LATEKS in Malaysia was diluted with a 0.12% aqueous solution of naphthenic acid sodium salt to adjust the solid rubber content to 10%. Further, sodium dihydrogen phosphate was added to adjust the pH to 9.2. Thereto was added a proteolytic enzyme (2.0 M alcalase) in an amount of 0.87 g per 10 g of the rubber content. Then the pH was again adjusted to 9.2, and the resultant mixture was maintained at 37° C. for 24 hours.

Next, the latex obtained after completion of the enzymatic treatment was combined with a 1% aqueous solution of a nonionic surfactant (trade name: EMULGEN 810) from Kao Corporation to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated again. The resulting cream fraction was dispersed in distilled water to prepare a deproteinized rubber latex having a solid rubber content of 30%.

To the latex was added formic acid with slow stirring to adjust the pH to 4.0. Subsequently, a cationic polymer flocculant was added and the mixture was stirred for 2 minutes, so that coagulation occurred. The thus obtained coagulum (coagulated rubber) had a diameter of approximately 0.5-3 mm. The coagulum was taken out and then immersed in 1000 mL of a 2% by mass aqueous solution of sodium carbonate for 4 hours at room temperature, and then the rubber was taken out. The obtained rubber was combined with 1000 mL of water and the mixture was stirred for 2 minutes and then dehydrated as much as possible. This cycle of operation was repeated seven times. The resultant rubber was formed into a sheet using a creper, followed by drying for 4 hours at 90° C. In this manner, a solid rubber was prepared.

Comparative Production Example 2-4

A solid rubber was prepared as in Comparative Production Example 2-3, except for the following differences: After the rubber coagulation, the coagulum was not treated with then aqueous solution of sodium carbonate, but was directly combined with 1000 mL of water and the mixture was stirred for 2 minutes and then dehydrated as much as possible, which cycle of operation was repeated seven times; and the resultant rubber was formed into a sheet using a creper, followed by drying for 4 hours at 90° C.

The solid rubbers obtained above were evaluated as described below. Tables 1 and 2 show the results.

<Measurement of pH of Rubber>

The obtained rubber in an amount of 5 g was cut into pieces with a size of 5 mm or smaller (about 1-2×about 1-2×about 1-2 (mm)), which were then placed in a 100 mL-beaker and combined with 50 mL of distilled water at room temperature. The contents of the beaker were heated to 90° C. over two minutes, and then irradiated with microwave (300 W) for 13 minutes (total 15 minutes) while controlling the temperature at constant 90° C. Then, after the immersion water was cooled to 25° C. in an ice bath, the pH of the immersion water was measured with a pH meter.

<Heat-aging Resistance>

The Mooney viscosity ML (1+4) at 130° C. of the solid rubber was measured before and after heating treatment at 80° C. for 18 hours in conformity with JIS K 6300:2001-1. A heat-aging resistance index was then calculated according to the above-mentioned formula. A rubber having a Mooney viscosity in the range of 50 to 70, particularly of 50 to 65, before the heat treatment has good physical properties and does not need mastication and thus is excellent. A rubber having too low a Mooney viscosity has poor physical properties. Moreover, a higher heat-aging resistance index indicates better heat-aging resistance.

<Measurement of Nitrogen Content>

(Acetone Extraction (Preparation of Test Piece))

The solid rubbers were each finely cut into 1 mm cubes and about 0.5 g of the cubes were weighed. The samples thus prepared were each immersed in 50 g of acetone for 48 hours at room temperature (25° C.). Then, the rubber was taken out and dried, thereby providing a test piece (after extraction of antioxidants).

(Measurement)

The nitrogen content of the test pieces was measured by the following method.

The acetone-extracted test pieces obtained above were each decomposed and gasified using a trace nitrogen/carbon analyzer "SUMIGRAPH NC 95A (Sumika Chemical Analysis Service, Ltd.)", and the gas generated was analyzed using a gas chromatograph "GC-8A" (Shimadzu Corporation) to determine the nitrogen content.

<Measurement of Phosphorus Content>

The phosphorus content was determined using an ICP emission spectrometer (P-4010, Hitachi, Ltd.).

<Measurement of Gel Content>

The raw rubber was cut into 1 mm×1 mm pieces, and about 70 mg of the pieces were accurately weighed. The sample thus prepared was combined with 35 mL of toluene and the mixture was allowed to stand still in a cool, dark place for 1 week. Subsequently, the mixture was centrifuged so that a gel fraction that was insoluble in toluene was sedimented, and a toluene-soluble supernatant was then removed. Only the gel fraction was solidified with methanol and then dried. The mass of the dried gel fraction was measured. The gel content (%) was determined according to the following formula.

Gel content (% by mass)=[mass after drying (mg)]/[initial mass of sample (mg)]×100

TABLE 1

(Solid rubber: Saponified natural rubber)

| | | Production Example | | | | | | | | | | Comparative Production Example | | | |
|---|---|---|---|---|---|---|---|---|---|---|---|---|---|---|---|
| | | 1-1 | 1-2 | 1-3 | 1-4 | 1-5 | 1-6 | 1-7 | 1-8 | 1-9 | 1-10 | 1-1 | 1-2 | 1-3 | 1-4 |
| Evaluation | pH | 5.0 | 3.8 | 4.2 | 4.7 | 5.7 | 4.9 | 5.7 | 5.4 | 4.8 | 4.6 | 8 | 8.5 | 8.2 | 8.6 |
| | Nitrogen content (% by mass) | 0.0.7 | 0.07 | 0.08 | 0.07 | 0.07 | 0.06 | 0.08 | 0.06 | 0.07 | 0.13 | 0.08 | 0.07 | 0.08 | 0.07 |
| | Phosphorus content (ppm) | 92 | 88 | 90 | 94 | 92 | 98 | 101 | 95 | 102 | 113 | 89 | 93 | 89 | 101 |
| | Gel content (% by mass) | 6 | 7 | 6 | 8 | 7 | 8 | 9 | 8 | 7 | 8 | 8 | 6 | 12 | 10 |
| | Mooney viscosity before heat treatment (ML(1 + 4) 130° C.) | 58 | 56 | 59 | 59 | 60 | 60 | 61 | 59 | 62 | 61 | 59 | 60 | 62 | 63 |
| | Heat-aging resistance index (%) | 95 | 89 | 100 | 102 | 88 | 101 | 88 | 96 | 100 | 82 | 60 | 41 | 73 | 58 |

TABLE 2

(Solid rubber: Deproteinized natural rubber)

| | | Production Example | | | | | | | | | | Comparative Production Example | | | |
|---|---|---|---|---|---|---|---|---|---|---|---|---|---|---|---|
| | | 2-1 | 2-2 | 2-3 | 2-4 | 2-5 | 2-6 | 2-7 | 2-8 | 2-9 | 2-10 | 2-1 | 2-2 | 2-3 | 2-4 |
| Evaluation | pH | 4.9 | 3.6 | 4.1 | 4.5 | 5.3 | 5.1 | 5.2 | 4.9 | 5 | 4.9 | 8.1 | 9.5 | 8.8 | 7.9 |
| | Nitrogen content (% by mass) | 0.02 | 0.02 | 0.02 | 0.02 | 0.03 | 0.02 | 0.02 | 0.02 | 0.02 | 0.03 | 0.02 | 0.02 | 0.02 | 0.03 |
| | Phosphorus content (ppm) | 102 | 99 | 105 | 97 | 96 | 103 | 105 | 100 | 101 | 102 | 93 | 95 | 108 | 105 |
| | Gel content (% by mass) | 9 | 10 | 8 | 8 | 9 | 7 | 9 | 8 | 8 | 7 | 8 | 7 | 7 | 8 |
| | Mooney viscosity before heat treatment (ML(1 + 4) 130° C.) | 58 | 61 | 61 | 59 | 60 | 58 | 59 | 58 | 60 | 62 | 60 | 60 | 61 | 63 |
| | Heat-aging resistance index (%) | 85 | 83 | 97 | 100 | 85 | 104 | 98 | 99 | 95 | 96 | 58 | 28 | 52 | 48 |

Tables 1 and 2 show that the modified natural rubbers which had a pH within the range of 2 to 7 as well as a specific Mooney viscosity before heat treatment, a specific nitrogen content or a specific phosphorus content, and also had an appropriate heat-aging resistance index, exhibited better heat-aging resistance than the rubbers outside the above ranges.

<Preparation of Vulcanized Rubber Composition>

Based on the formulations shown in Tables 3 to 8, the chemicals other than the sulfur and the vulcanization accelerator were kneaded using a 1.7-L Banbury mixer. Next, the sulfur and the vulcanization accelerator were kneaded with the kneaded mixture using a roll to prepare an unvulcanized rubber composition. The unvulcanized rubber composition was press-vulcanized for 12 minutes at 150° C. to give a vulcanized product. The vulcanized product was evaluated as follows. Tables 3 and 4 show the results. The kneading was carried out using 10 times the amount of the rubber produced in each of the production examples and comparative production examples. Comparative Examples 1-5, 2-5, 3-1, 3-2, 4-1, and 4-2 were set as reference comparative examples.

The rubber compositions listed in Tables 5 to 8 were each prepared as follows: An unvulcanized rubber composition obtained by the above preparation method was formed into a sheet having a thickness of 2.1 mm and vulcanized at 150° C. for 30 minutes, and the resultant vulcanized rubber composition having a thickness of 2 mm was used. Moreover, for use in radiation analysis, an unvulcanized rubber composition obtained by the above preparation method was formed into a sheet having a thickness of 1.1 mm, and the resulting vulcanized rubber composition having a thickness of 1 mm was used.

<Rolling Resistance>

The loss tangent (tan 67) of each composition (vulcanized product) was measured using a viscoelasticity spectrometer VES (Iwamoto Seisakusho) at a temperature of 70° C., an initial strain of 10%, a dynamic strain of 1%, and a frequency of 10 Hz. The rolling resistance index of the reference comparative example was set equal to 100, and rolling resistance indices were calculated using the equation below. A lower rolling resistance index indicates lower rolling resistance, and thus is preferable.

(Rolling resistance index)=(tan δ of each composition)/(tan δ of reference comparative example)×100

<Determination of Dispersibility of Carbon Black and Silica (Determination of Radius of Gyration) by SAXS>

The beamlines BL03XU and BL20XU of the large synchrotron radiation facility "SPring-8" belonging to Japan Synchrotron Radiation Research Institute were used in the determination. An about 1 mm-thick sheet of the vulcanized rubber composition was swollen in toluene for 12 hours and then mounted on a sample holder, and the sample was irradiated with X-rays at room temperature. A scattering intensity curve obtained by the analysis with BL03XU and a scattering intensity curve obtained by the analysis with BL20XU, as described later, were combined by least squares. These two curves were combined as follows: the scattering intensity curve obtained with BL03XU at larger angles was fixed, and the scattering intensity curve obtained with BL20XU at smaller angles was then shifted. Thus, a scattering intensity curve I(q) was prepared by the SAXS analysis. The scattering intensity curve I(q) reflects the state of the carbon black or silica in the vulcanized rubber composition. The obtained scattering intensity curve I(q) was curve fitted with Formula 2 and Formula 3 to determine radii of gyration $R_g$, among which the maximum radius of gyration $R_g$ (unit: nm) was obtained.

A smaller value indicates that the carbon black or silica has a higher dispersibility.

(SAXS Apparatus)

SAXS: SAXS analysis apparatus provided with the beamlines BL03XU and BL20XU of the large synchrotron radiation facility "SPring-8" belonging to Japan Synchrotron Radiation Research Institute (Analysis Conditions)

Brilliance of X-rays: $5 \times 10^{12}$ photons/s/mrad²/mm²/0.1% bw

Number of photons in X-rays: $2 \times 10^9$ photons/s

Energy of X-rays: 8 keV (BL03XU), 23 keV (BL20XU)

Distance between sample and detector: 3 m (BL03XU), 160 m (BL20XU)

(Detector)

Two-dimensional detector (image intensifier and CCD camera)

<Determination of Dispersibility of Carbon Black and Silica (Determination of Radius of Gyration) by SANS>

An about 1 mm-thick sheet of the vulcanized rubber composition was swollen to equilibrium in a deuterated solvent and then mounted on a sample holder, and the sample was irradiated with neutrons at room temperature in the SANS-J beamline at the JRR-3 research reactor belonging to Japan Atomic Energy Agency, Independent Administrative Agency. The wavelength of neutrons used was 6.5 Å. The distance between the sample and the detector used was 2.5 m or 10 m. A two-dimensional detector was used to detect neutron scattering intensity. The scattering intensity curve I(q) thus obtained reflects the state of the carbon black or silica in the vulcanized rubber composition. The obtained scattering intensity curve I(q) was curve fitted with Formula 2 and Formula 3 to determine radii of gyration $R_g$, among which the maximum radius of gyration $R_g$ (unit: nm) was obtained.

A smaller value indicates that the carbon black or silica has a higher dispersibility.

(SANS Apparatus)

SANS: SANS analysis apparatus provided with the SANS-J beamline at the JRR-3 research reactor belonging to Japan Atomic Energy Agency, Independent Administrative Agency (Analysis Conditions)

Wavelength of neutrons: 6.5 Å

Flux density of neutrons: $9.9 \times 10^7$ neutrons/cm²/s Distance between sample and detector: 2.5 m or 10 m (in order to obtain the information at smaller angles, the sample was further measured at a distance of 10 m from the detector using a focusing lens.)

(Detector)

Two-dimensional detector ($^3$He two-dimensional detector and two-dimensional photomultiplier+ZnS/$^6$LiF detector)

<Determination of Dispersibility of Carbon Black and Silica by ASTM Method>

The dispersibility of carbon black or silica in each vulcanized rubber composition was determined in conformity with the ASTM D2663 B method. A test piece having a size of about 3 mm in width×8 mm in length×2 mm in thickness was taken from each vulcanized rubber composition, and the test piece was pasted on a sample stage of a microtome and then cured by cooling with liquid nitrogen or dry ice. A slice having a thickness of about 2 μm was sliced with the microtome equipped with a glass knife. The slice was immersed and swollen in solvent naphtha. The swollen slice was spread on a glass plate of a microscope and observed through an eyepiece lens provided with a grid reticle with a 10×10 μm grid, 100 squares on each side (10,000 squares total) at a total magnification of 75 to 100 times to determine the number of undispersed lumps occupying at least one half of each square. A dispersion degree was calculated according to the formula below, and expressed as an index relative to that of the reference comparative example (=100). A higher index indicates better dispersibility.

Dispersion degree (%)=100−S×U/L

S: Total number of squares occupied by undispersed lumps of carbon black or silica U: Swelling factor of measured sample [(area of measured sample after swelling)/(area of measured sample before swelling)]

L: Volume fraction (%) of carbon black or silica in compound (the following formula)

$$L = \frac{(\text{Amount in parts by mass of carbon black or silica})}{(\text{Amount in parts by mass of carbon black or silica}) + 2 \times [(100 \text{ parts by mass of rubber component}) + (\text{amount in parts by mass of oil})]} \times 100$$

(The amounts of carbon black, silica and oil are per 100 parts by mass of the rubber component.)

<Processability>

The Mooney viscosity of the obtained unvulcanized rubber compositions was measured at 130° C. in conformity with JIS K 6300. The Mooney viscosity ML (1+4) values are expressed as an index relative to that of the reference comparative example (=100) using the following equation. A higher index indicates a lower Mooney viscosity, which in turns indicates better processability.

<Breaking Resistance>

No. 3 dumbbell specimens prepared from the vulcanized rubber compositions were subjected to tensile testing in conformity with JIS K 6251 to measure tensile strength at break (TB) and elongation at break (EB). Then the value TB×EB/2 was defined as breaking strength, and the breaking strength of each composition is expressed as an index relative to that of the reference comparative example (=100) using the equation below. A higher index indicates better breaking resistance.

(Breaking resistance index)=(TB×EB/2 of each composition)/(TB×EB/2 in reference comparative example)×100

TABLE 3

(Rubber composition: Saponified natural rubber)

| | | Example | | | | | | | |
|---|---|---|---|---|---|---|---|---|---|
| | | 1-1 | 1-2 | 1-3 | 1-4 | 1-5 | 1-6 | 1-7 | 1-8 |
| Formulation (parts by mass) | Solid rubber (100 parts by mass) | Rubber in Prod. Ex. 1-1 | Rubber in Prod. Ex. 1-2 | Rubber in Prod. Ex. 1-3 | Rubber in Prod. Ex. 1-4 | Rubber in Prod. Ex. 1-5 | Rubber in Prod. Ex. 1-6 | Rubber in Prod. Ex. 1-7 | Rubber in Prod. Ex. 1-8 |
| | Carbon black 1 | 50 | 50 | 50 | 50 | 50 | 50 | 50 | 50 |
| | Zinc oxide | 3 | 3 | 3 | 3 | 3 | 3 | 3 | 3 |
| | Stearic acid | 2 | 2 | 2 | 2 | 2 | 2 | 2 | 2 |
| | Antioxidant 1 | 1.5 | 1.5 | 1.5 | 1.5 | 1.5 | 1.5 | 1.5 | 1.5 |
| | Insoluble sulfur 1 | 1.67 | 1.67 | 1.67 | 1.67 | 1.67 | 1.67 | 1.67 | 1.67 |
| | Vulcanization accelerator TBBS (NS) | 1 | 1 | 1 | 1 | 1 | 1 | 1 | 1 |
| Evaluation | Rolling resistance index | 90 | 89 | 91 | 89 | 93 | 88 | 91 | 89 |

| | | Example | | Comparative Example | | | | |
|---|---|---|---|---|---|---|---|---|
| | | 1-9 | 1-10 | 1-1 | 1-2 | 1-3 | 1-4 | 1-5 |
| Formulation (parts by mass) | Solid rubber (100 parts by mass) | Rubber in Prod Ex. 1-9 | Rubber in Prod. Ex. 1-10 | Rubber in Com. Prod. Ex. 1-1 | Rubber in Com. Prod. Ex. 1-2 | Rubber in Com. Prod. Ex. 1-3 | Rubber in Com. Prod. Ex. 1-4 | TSR |
| | Carbon black 1 | 50 | 50 | 50 | 50 | 50 | 50 | 50 |
| | Zinc oxide | 3 | 3 | 3 | 3 | 3 | 3 | 3 |
| | Stearic acid | 2 | 2 | 2 | 2 | 2 | 2 | 2 |
| | Antioxidant 1 | 1.5 | 1.5 | 1.5 | 1.5 | 1.5 | 1.5 | 1.5 |
| | Insoluble sulfur 1 | 1.67 | 1.67 | 1.67 | 1.67 | 1.67 | 1.67 | 1.67 |
| | Vulcanization accelerator TBBS (NS) | 1 | 1 | 1 | 1 | 1 | 1 | 1 |
| Evaluation | Rolling resistance index | 89 | 93 | 98 | 104 | 97 | 99 | 100 |

TABLE 4

(Rubber composition: Deproteinized natural rubber)

| | | Example | | | | | | | |
|---|---|---|---|---|---|---|---|---|---|
| | | 2-1 | 2-2 | 2-3 | 2-4 | 2-5 | 2-6 | 2-7 | 2-8 |
| Formulation (parts by mass) | Solid rubber (100 parts by mass) | Rubber in Prod. Ex. 2-1 | Rubber in Prod Ex. 2-2 | Rubber in Prod Ex. 2-3 | Rubber in Prod. Ex. 2-4 | Rubber in Prod. Ex. 2-5 | Rubber in Prod Ex. 2-6 | Rubber in Prod Ex. 2-7 | Rubber in Prod Ex. 2-8 |
| | Carbon black 1 | 50 | 50 | 50 | 50 | 50 | 50 | 50 | 50 |
| | Zinc oxide | 3 | 3 | 3 | 3 | 3 | 3 | 3 | 3 |
| | Stearic acid | 2 | 2 | 2 | 2 | 2 | 2 | 2 | 2 |
| | Antioxidant 1 | 1.5 | 1.5 | 1.5 | 1.5 | 1.5 | 1.5 | 1.5 | 1.5 |
| | Insoluble sulfur 1 | 1.67 | 1.67 | 1.67 | 1.67 | 1.67 | 1.67 | 1.67 | 1.67 |
| | Vulcanization accelerator TBBS (NS) | 1 | 1 | 1 | 1 | 1 | 1 | 1 | 1 |
| Evaluation | Rolling resistance index | 90 | 90 | 88 | 87 | 93 | 91 | 93 | 90 |

| | | Example | | Comparative Example | | | | |
|---|---|---|---|---|---|---|---|---|
| | | 2-9 | 2-10 | 2-1 | 2-2 | 2-3 | 2-4 | 2-5 |
| Formulation (parts by mass) | Solid rubber (100 parts by mass) | Rubber in Prod. Ex. 2-9 | Rubber in Prod. Ex. 2-10 | Rubber in Com. Prod. Ex. 2-1 | Rubber in Com. Prod. Ex. 2-2 | Rubber in Com. Prod. Ex. 2-3 | Rubber in Com. Prod Ex. 2-4 | TSR |
| | Carbon black 1 | 50 | 50 | 50 | 50 | 50 | 50 | 50 |
| | Zinc oxide | 3 | 3 | 3 | 3 | 3 | 3 | 3 |
| | Stearic acid | 2 | 2 | 2 | 2 | 2 | 2 | 2 |
| | Antioxidant 1 | 1.5 | 1.5 | 1.5 | 1.5 | 1.5 | 1.5 | 1.5 |
| | Insoluble sulfur 1 | 1.67 | 1.67 | 1.67 | 1.67 | 1.67 | 1.67 | 1.67 |

TABLE 4-continued (Rubber composition: Deproteinized natural rubber)

| | | | | | | | | |
|---|---|---|---|---|---|---|---|---|
| | Vulcanization accelerator TBBS (NS) | 1 | 1 | 1 | 1 | 1 | 1 | 1 |
| Evaluation | Rolling resistance index | 92 | 94 | 97 | 105 | 101 | 99 | 100 |

Tables 1 to 4 show that the examples using the solid rubbers prepared in Production Examples 1-1 to 2-10 exhibited excellent fuel economy and excellent heat-aging resistance, and also had good properties in terms of T95 and T10 and therefore excellent processability.

TABLE 5

(Rubber composition: Saponified natural rubber)

| | | Example 3-1 | Comparative Example 3-1 |
|---|---|---|---|
| Formulation (parts by mass) | Solid rubber (100 parts by mass) | Rubber in Production Example 1-1 | TSR |
| | Carbon black 2 | 60 | 60 |
| | Oil | 2 | 2 |
| | Stearic acid | 2 | 2 |
| | Antioxidant 2 | 1.5 | 1.5 |
| | Insoluble sulfur 2 | 6.25(5) | 6.25(5) |
| | Vulcanization accelerator TBBS (NS) | 1.5 | 1.5 |
| Evaluation | Radius of gyration determined by SAXS analysis | 256 | 320 |
| | Radius of gyration determined by SANS analysis | 256 | 320 |
| | Dispersibility index of carbon black determined by ASTM method | 101 | 100 |
| | Rolling resistance index | 93 | 100 |
| | Processability index | 115 | 100 |
| | Breaking resistance index | 106 | 100 |

TABLE 6

(Rubber composition: Saponified natural rubber)

| | | Example 3-2 | Comparative Example 3-2 |
|---|---|---|---|
| Formulation (parts by mass) | Solid rubber (100 parts by mass) | Rubber in Production Example 1-1 | TSR |
| | Silica | 50 | 50 |
| | Oil | 2 | 2 |
| | Stearic acid | 2 | 2 |
| | Antioxidant 2 | 1.5 | 1.5 |
| | Insoluble sulfur 2 | 6.25(5) | 6.25(5) |
| | Vulcanization accelerator TBBS (NS) | 1.5 | 1.5 |
| Evaluation | Radius of gyration determined by SAXS analysis | 512 | 625 |
| | Radius of gyration determined by SANS analysis | 512 | 625 |
| | Dispersibility index of carbon black determined by ASTM method | 98 | 100 |
| | Rolling resistance index | 90 | 100 |
| | Processability index | 120 | 100 |
| | Breaking resistance index | 109 | 100 |

TABLE 7

(Rubber composition: Deproteinized natural rubber)

| | | Example 4-1 | Comparative Example 4-1 |
|---|---|---|---|
| Formulation (parts by mass) | Solid rubber (100 parts by mass) | Rubber in Production Example 2-1 | TSR |
| | Carbon black 2 | 60 | 60 |
| | Oil | 2 | 2 |
| | Stearic acid | 2 | 2 |
| | Antioxidant 2 | 1.5 | 1.5 |
| | Insoluble sulfur 2 | 6.25(5) | 6.25(5) |
| | Vulcanization accelerator TBBS (NS) | 1.5 | 1.5 |
| Evaluation | Radius of gyration determined by SAXS analysis | 258 | 320 |
| | Radius of gyration determined by SANS analysis | 258 | 320 |
| | Dispersibility index of silica determined by ASTM method | 102 | 100 |
| | Rolling resistance index | 95 | 100 |
| | Processability index | 108 | 100 |
| | Breaking resistance index | 104 | 100 |

TABLE 8

(Rubber composition: Deproteinized natural rubber)

| | | Example 4-2 | Comparative Example 4-2 |
|---|---|---|---|
| Formulation (parts by mass) | Solid rubber (100 parts by mass) | Rubber in Production Example 2-1 | TSR |
| | Silica | 50 | 50 |
| | Oil | 2 | 2 |
| | Stearic acid | 2 | 2 |
| | Antioxidant 2 | 1.5 | 1.5 |
| | Insoluble sulfur 2 | 6.25(5) | 6.25(5) |
| | Vulcanization accelerator TBBS (NS) | 1.5 | 1.5 |
| Evaluation | Radius of gyration determined by SAXS analysis | 551 | 625 |
| | Radius of gyration determined by SANS analysis | 551 | 625 |
| | Dispersibility index of silica determined by ASTM method | 98 | 100 |
| | Rolling resistance index | 93 | 100 |
| | Processability index | 114 | 100 |
| | Breaking resistance index | 105 | 100 |

Tables 5 to 8 demonstrates that the examples using highly purified, modified natural rubbers whose pH was adjusted to 2 to 7 had a smaller radius of gyration and markedly improved fuel economy, processability, and breaking resistance as compared to the comparative examples using a common natural rubber.

Moreover, the dispersibility index of carbon black or silica determined by the ASTM method was not correlated with the above properties, whereas the radius of gyration was correlated with them.

The invention claimed is:

1. A modified natural rubber which has a phosphorus content of 200 ppm or less and whose pH is adjusted to 2 to 7,
wherein the pH is determined by cutting 5 g of the modified natural rubber into cubes at most 2 mm on each side, immersing the cubes in 50 mL of distilled water and extracting them at 90° C. for 15 minutes under microwave irradiation, and then measuring the immersion water with a pH meter.

2. The modified natural rubber according to claim 1, wherein the modified natural rubber has a Mooney viscosity ML (1+4) at 130° C. of 75 or less as measured in conformity with JIS K 6300:2001-1, and has a heat-aging resistance index defined by the following formula of 75 to 120%, $$\text{Heat-aging resistance index (\%)} = \frac{\text{Mooney viscosity of the modified natural rubber determined after 18-hour heat treatment at 80° C.}}{\text{Mooney viscosity of the modified natural rubber before the treatment}} \times 100.$$

3. A modified natural rubber which has a phosphorus content of 200 ppm or less and whose pH is 2 to 7, the modified natural rubber being obtained by removing non-rubber components from natural rubber, and treating the resultant rubber with an acidic compound,
wherein the pH is determined by cutting 5 g of the modified natural rubber into cubes at most 2 mm on each side, immersing the cubes in 50 mL of distilled water and extracting them at 90° C. for 15 minutes under microwave irradiation, and then measuring the immersion water with a pH meter.

4. The modified natural rubber according to claim 3, which has a heat-aging resistance index defined above of 75 to 120%.

5. The modified natural rubber according to claim 1, which has a nitrogen content of 0.15% by mass or less.

6. The modified natural rubber according to claim 1, which has a gel content measured as toluene-insolubles of 20% by mass or less.

7. A modified natural rubber which has a phosphorus content of 200 ppm or less and whose pH is 2 to 7, the modified natural rubber being obtained by washing a saponified natural rubber latex, and treating the washed latex with an acidic compound,
wherein the pH is determined by cutting 5 g of the modified natural rubber into cubes at most 2 mm on each side, immersing the cubes in 50 mL of distilled water and extracting them at 90° C. for 15 minutes under microwave irradiation, and then measuring the immersion water with a pH meter.

8. The modified natural rubber according to claim 7, which has a heat-aging resistance index defined above of 75 to 120%.

9. The modified natural rubber according to claim 7, wherein the washing is performed until the rubber has a phosphorus content of 200 ppm or less.

10. A modified natural rubber whose pH is 2 to 7, the modified natural rubber being obtained by washing a deproteinized natural rubber latex, and treating the washed latex with an acidic compound,
wherein the pH is determined by cutting 5 g of the modified natural rubber into cubes at most 2 mm on each side, immersing the cubes in 50 mL of distilled water and extracting them at 90° C. for 15 minutes under microwave irradiation, and then measuring the immersion water with a pH meter.

11. The modified natural rubber according to claim 1, which has a heat-aging resistance index defined above of 75 to 120%.

12. The modified natural rubber according to claim 10, wherein the washing is performed until the rubber has a nitrogen content of 0.15% by mass or less.

13. A method for producing the modified natural rubber according to claim 1, the method comprising:
Step 1-1 of saponifying natural rubber latex;
Step 1-2 of washing the saponified natural rubber latex; and
Step 1-3 of treating the washed latex with an acidic compound.

14. A method for producing the modified natural rubber according to claim 1, the method comprising:
Step 2-1 of deproteinizing natural rubber latex;
Step 2-2 of washing the deproteinized natural rubber latex; and
Step 2-3 of treating the washed latex with an acidic compound.

15. A tire rubber composition, comprising:
a rubber component; and
at least one of carbon black and a white filler,
the rubber component comprising the modified natural rubber according to claim 1 in an amount of 5% by mass or more based on 100% by mass of the rubber component.

16. The tire rubber composition according to claim 15, wherein a radius of gyration of a cluster of the carbon black is 300 nm or less.

17. The tire rubber composition according to claim 15, wherein the white filler is silica, and
a radius of gyration of a cluster of the silica is 600 nm or less.

18. The tire rubber composition according to claim 16, wherein the radius of gyration is determined by x-ray scattering analysis or neutron scattering analysis.

19. The tire rubber composition according to claim 18, wherein the analysis is carried out under conditions where q defined by the following Formula 1 is in a range of 10 nm$^{-1}$ or less, $$q = \frac{4\pi \sin(\theta/2)}{\lambda} \qquad \text{(Formula 1)}$$

wherein θ is scattering angle; and λ is wavelength of X-rays or neutrons.

20. The tire rubber composition according to claim 16, wherein the radius of gyration is a maximum radius of gyration $R_g$ among radii of gyration $R_g$ determined by curve fitting a scattering intensity curve I(q) obtained by the analysis to the following Formula 2 and Formula 3:

$$I_{(q)} = \sum_{i=1}^{n} \left\{ P_i \left[ \left\{ \mathrm{erf}\left(\frac{qR_{gi}}{\sqrt{6}}\right)^3 /q \right\} \right]^{D_{fi}} \exp\left(\frac{-q^2 R_{g(i+1)}^2}{3}\right) + \right.$$
$$\left. G_i \exp\left(\frac{-q^2 R_{g(i+1)}^2}{3}\right) \right\} +$$
$$P_{n+1} \left[ \left\{ \mathrm{erf}\left(\frac{qR_{g(n+1)}}{\sqrt{6}}\right)^3 /q \right\} \right]^{D_{f(n+1)}}$$

(Formula 2)

$$\mathrm{erf}(z) = \frac{2}{\sqrt{\pi}} \int_0^z e^{-t^2} dt$$

(Formula 3)

wherein $P_i$, $G_i$, $R_{gi}$, and $D_{fi}$ are fitting parameters; n is an integer; q is as defined above; and z and t are any positive numbers.

21. A pneumatic tire, formed from the tire rubber composition according to claim 15.

22. The modified natural rubber according to claim 1, wherein the modified natural rubber is produced by saponifying natural rubber latex; washing the saponified natural rubber latex until the latex has a nitrogen content of 0.15% by mass or less; and treating the washed latex with an acidic compound.

\* \* \* \* \*